US010020721B2

(12) United States Patent
Davis

(10) Patent No.: US 10,020,721 B2
(45) Date of Patent: Jul. 10, 2018

(54) SELF-RECHARGING ELECTRIC GENERATOR SYSTEM

(71) Applicant: Percy Davis, Washington, DC (US)

(72) Inventor: Percy Davis, Washington, DC (US)

(73) Assignee: Percy Davis, Washington, DC (US)

(*) Notice: Subject to any disclaimer, the term of this patent is extended or adjusted under 35 U.S.C. 154(b) by 501 days.

(21) Appl. No.: 14/591,111

(22) Filed: Jan. 7, 2015

(65) Prior Publication Data

US 2015/0162814 A1 Jun. 11, 2015

Related U.S. Application Data

(63) Continuation-in-part of application No. 14/274,176, filed on May 9, 2014, now Pat. No. 8,994,215.

(60) Provisional application No. 61/888,456, filed on Oct. 8, 2013.

(51) Int. Cl.
| | |
|---|---|
| H02J 7/00 | (2006.01) |
| H02J 9/00 | (2006.01) |
| H02K 53/00 | (2006.01) |
| H02J 9/08 | (2006.01) |
| B60L 11/18 | (2006.01) |
| H02J 7/34 | (2006.01) |
| H02J 7/35 | (2006.01) |

(Continued)

(52) U.S. Cl.
CPC .......... *H02K 53/00* (2013.01); *B60L 11/1814* (2013.01); *H02J 7/34* (2013.01); *H02J 9/08* (2013.01); *H02J 7/1415* (2013.01); *H02J 7/35* (2013.01); *H02J 9/066* (2013.01); *Y02E 10/766* (2013.01); *Y10T 307/615* (2015.04); *Y10T 307/62* (2015.04)

(58) Field of Classification Search
CPC .... H02J 7/1415; H02J 7/34; H02J 7/35; H02J 9/066; H02J 9/08; H02K 53/00; B60L 11/1814; Y10T 307/65; Y10T 307/62; Y02E 10/766
USPC ...................................... 307/64–66, 150–151
See application file for complete search history.

(56) References Cited

U.S. PATENT DOCUMENTS

| | | |
|---|---|---|
| 7,071,581 B2 | 7/2006 | Eisenhaure et al. |
| 7,876,065 B2 | 1/2011 | Grant, Sr. |
| 8,456,039 B2 | 6/2013 | Rivera Vasquez et al. |

(Continued)

FOREIGN PATENT DOCUMENTS

WO    WO 2013108246 A2 *  7/2013  .......... B60L 11/1861

*Primary Examiner* — Hal Kaplan
(74) *Attorney, Agent, or Firm* — Brundidge & Stanger, P.C.

(57) ABSTRACT

A self-recharging electric generator system in communication with an external system, where the external system includes a power source external to the self-recharging electric generator system, and the self-recharging electric generator system includes at least one electric motor configured to receive power from the power source of the external system, at least one generator configured to produce power to be supplied to the external system, and to the at least one electric motor, at least one sensing device configured to be connected with an onboard battery system of the external system, to sense a charge status of the onboard battery system, and a switch device electrically coupled with the at least one sensing device and configured to switch from the power source of the external system to the at least one generator as the source for supplying power to the at least one electric motor.

20 Claims, 6 Drawing Sheets

(51) Int. Cl.
*H02J 9/06* (2006.01)
*H02J 7/14* (2006.01)

(56) References Cited

U.S. PATENT DOCUMENTS

| | | |
|---|---|---|
| 8,575,778 B2 | 11/2013 | Chen |
| 2002/0007975 A1* | 1/2002 | Naito .................... B60K 6/485 180/65.26 |
| 2004/0084965 A1* | 5/2004 | Welches .................... H02J 3/01 307/64 |
| 2006/0202559 A1 | 9/2006 | Hashimoto et al. |
| 2012/0037438 A1* | 2/2012 | Schultz .................... B60K 6/28 180/65.22 |
| 2012/0091943 A1 | 4/2012 | Manor et al. |
| 2012/0217905 A1* | 8/2012 | Anthes ................. H02J 7/1415 318/139 |
| 2013/0293023 A1* | 11/2013 | Collie ....................... H02J 3/46 307/84 |

\* cited by examiner

SELF-RECHARGING ELECTRIC GENERATOR SYSTEM

CROSS-REFERENCE TO RELATED PATENT APPLICATION

This U.S. non-provisional patent application is a continuation-in-part application (CIP) of U.S. patent application Ser. No. 14/274,176, filed on May 9, 2014 which relates to PCT Application No. PCT/US2014/59252, filed on Oct. 6, 2014 which is herein incorporated by reference, and is also based on and claims the benefit of priority from provisional application Ser. No. 61/888,456, filed on Oct. 8, 2013, the entire contents of which are incorporated herein by reference.

BACKGROUND OF THE INVENTION

1. Field of the Invention

The present invention relates to generator systems. More particularly, the present invention relates to self-recharging, portable electric generator systems for use in building structures (e.g., commercial, residential homes), vehicles (e.g., electric vehicles).

2. Description of the related art.

Today, portable gasoline-only generators are commonly used in residential homes, for example, as a backup power supply to a main power supply system in the event of a power failure. Use of gasoline for powering of a generator requires added expenses e.g., fuel expense, in comparison to use of an electric generator. Further, the gasoline powered generators emit unwanted fumes associated with gas combustion.

Therefore, electric generators are better for use as backup power supply to main power supply systems and are potentially able to be used as main power supply systems within building structures and vehicles. An electric generator converts mechanical energy to electrical energy and forces electric current to flow through an external circuit.

Electric vehicles employing an onboard power supply unit are also being used in lieu of gasoline-only powered vehicles. The onboard power supply unit typically includes at least one rechargeable battery unit to supply electric charge for operating the electric vehicle. The rechargeable battery unit typically lasts for a very short period of time before requiring recharging via a recharging station. Recharging stations are disposed at various locations to enable a driver to recharge the battery of the electric vehicle when necessary.

A self-rechargeable electric generator is desirable with use in building structures and vehicles, to extend power supply thereto for a longer period of time, when desired.

SUMMARY OF THE INVENTION

The present invention relates to self-recharging electric generator system and method for supplying power to an external system in connection with the generator system.

The present invention is a self-recharging electric generator system in communication with an external system and that includes a battery unit configured to supply power to the self-charging electric generator system, an automatic switching unit configured to switch between a main power supply source and the self-recharging electric generator system, at least one electric motor configured to receive power from the battery unit, and at least one generator configured to produce power to be supplied to the external system when a failure occurs at the main power supply source, where the power produced by at least one generator is further supplied to the automatic switching unit for performing continuous recharging of the self-recharging electric generator system.

Further, the present invention is a self-charging electric generator system which may be implemented with use of an uninterruptible power supply (UPS) battery unit, a self-contained rechargeable power system, or with other external power supply sources including renewable energy sources such as solar panels and wind turbines.

Further still, the present invention is a method for supplying power to an external system using a self-recharging electric generator system.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, systems, networks, processes, and other components may be shown as components in block diagram form in order not to obscure the embodiments in unnecessary detail. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The present invention as will be described in greater detail below provides a self-recharging electric generator system and method for supplying power to an external system using the same. Specifically, the system includes one or more generators supplying power to an external load and power to an automatic switching unit, rechargeable power supply unit or UPS battery unit, for example, in order to perform self-recharging in a closed-loop configuration. The present invention provides various embodiments as described below. However it should be noted that the present invention is not limited to the embodiments described herein, but could extend to other embodiments as would be known or as would become known to those skilled in the art.

Figure 1:
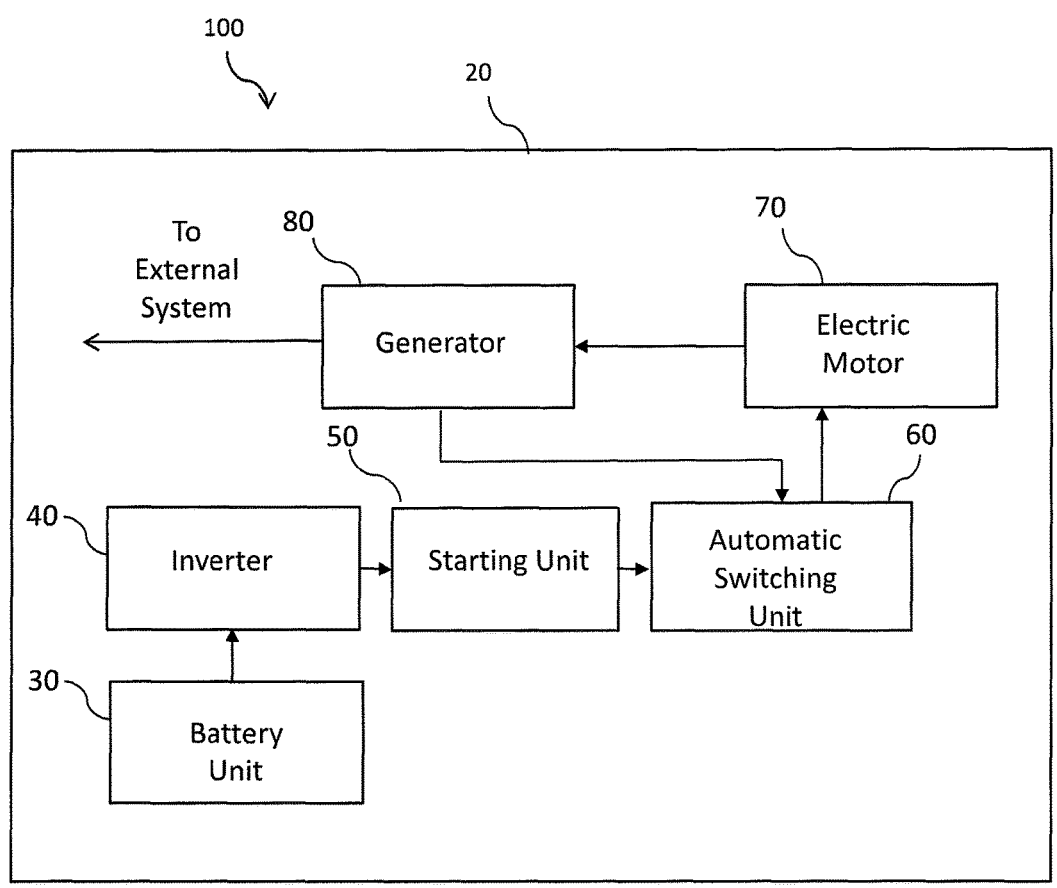
FIG. 1 is a block diagram of a self-recharging electric generator system that can be implemented within one or more embodiments of the present invention.

FIG. 1 is a block diagram of a self-recharging electric generator system that can be implemented within one or more embodiments of the present invention. The self-recharging electric generator system may be used as a primary source of power supply (as shown in FIG. 1) or as a backup power supply system (as shown in FIG. 5). In FIG. 1, a self-recharging electric generator system 100 includes a housing 20 comprising a battery unit 30, an inverter 40, a starting unit 50, an automatic switching unit 60, at least one electric motor 70 and at least one generator 80. According to some embodiments, the generator 80 comprises a generator head and an electric motor driving unit in communication with the electric motor 70, for driving the same. Although the disclosure is described using a self-recharging electric generator system as depicted in FIGS. 1-6 for use in building structures such as residential homes, and electric vehicles, respectively, however the embodiments of the present invention are not limited to residential homes and electric vehicles, and may be implemented within any other suitable system e.g., a power grid system, or any type of structure, as desired. The present invention may also be implemented within any other types of vehicles including airplanes and any vehicles which burn natural and fossil fuels including for example, trains and buses. The present invention may also be implemented as a portable power plant, for example, construction sites and cabins.

According to one or more embodiments, the battery unit 30 is a stand-alone battery unit electrically coupled to the inverter 40, for supplying direct current (DC) voltage to the inverter 40. The battery unit 30 may be any type of battery including a rechargeable battery, a cell-type battery, a lithium ion battery, or any other type of battery unit suitable for the purposes set forth herein.

The inverter 40 converts DC voltage to AC voltage to be supplied to the starting device 50 when starting the system 100. The direct current power is supplied at a voltage in the range of 120-220 volts. The automatic switching unit 60 receives the AC voltage supplied from the inverter 30 and supplies the power to the electric motor 70 for operating the generator 80. The generator 80 then supplies power as desired to an external system (e.g., a residential home or recreational vehicle). The generator 80 comprises a standard household electrical receptacle incorporated therein so that a device (e.g., an AC device) may be easily plugged therein. Although a single electric motor 70 and generator 80 combination is illustrated, the present invention is not limited to any particular number of electric motors 70 and generators 80 and may vary accordingly. For example, a pair of generators may be implemented in parallel, to perform two-stage generation. Two-stage generation may be implemented when a larger power supply is required for the external system. The first stage of two-stage generation may employ a small generator to generate electric power in amounts large enough to start a larger generator for operation during a second stage of the two-stage generation. The two-stage generation system may be used to eliminate a need to have a large battery supply to start the larger generator and the two-stage generation system may switch back to operating in the first stage using the small generator, to reduce power generation during non-peak hours.

Further as shown in FIG. 1, the generator 80 may be electrically coupled with the automatic switching unit 60, to connect the system 100 as a main source of power supply of the external system (e.g., a residential home). The automatic switching unit 60 switches from battery 30 to generator 80 as the source supplying electric motor 70 once the motor gets started and generator 80 is producing electricity.

In an alternative embodiment, battery 30 is optional, and automatic switching unit 60 may switch from a power source, which is external to the system 100, to generator 80 as the source supplying the electric motor 70. The power source may be any type of battery including a rechargeable battery, a cell-type battery, a lithium ion battery, or any other type of battery unit suitable for the purposes set forth herein.

According to other embodiments, a system 500 as shown in FIG. 5, operates as a backup power supply system. The components of system 500 are similar to those of system 100 as shown in FIG. 1, therefore a detailed description of each component has been omitted. The system 500 operates such that if a power outage occurs during use of a main power source 15, the system 500 may be automatically initiated to supply power to the external system. Further, similar to the system 100, the automatic switching unit 60 switches from battery 30 to generator 80 as the source supplying electric motor 70 once the motor gets started and generator 80 is producing electricity.

Still further, in an alternative embodiment, battery 30 is optional, and automatic switching unit 60 may switch from a power source, which is external to the system 500, to generator 80 as the source supplying the electric motor 70. The power source may be any type of battery including a rechargeable battery, a cell-type battery, a lithium ion battery, or any other type of battery unit suitable for the purposes set forth herein.

According to an embodiment of the present invention, the system 100 as well as the system 500 may also include one or more processing units or other computing devices external to or internal to the system to further enhance control and operation of the respective systems 100 and 500. Likewise, and any other of the respective systems 200, 300, 400 and 600 of FIGS. 2, 3, 4 and 6 may include one or more processing units or other computing devices external to or internal to the respective systems to further enhance control and operation of the respective systems.

Further, according to yet another embodiment of the present invention, systems 100 and 500 may include a transformer internal to or external to the systems 100 and 500 to further amplify or reduce the electric power supply provided by the systems 100 and 500.

Figure 2:
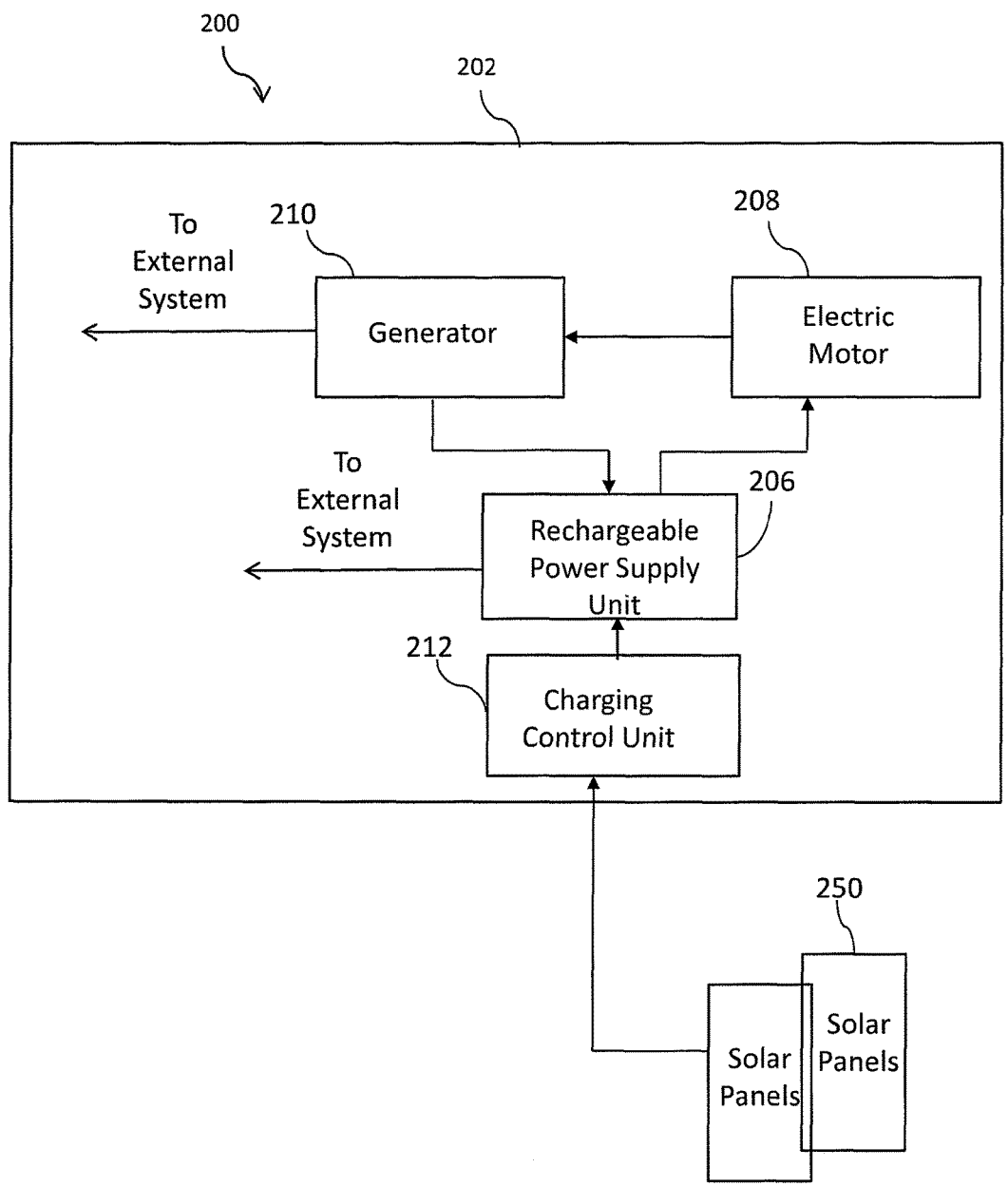
FIG. 2 is a block diagram of a self-recharging electric generator system that can be implemented within alternative embodiments of the present invention.
Figure 3:
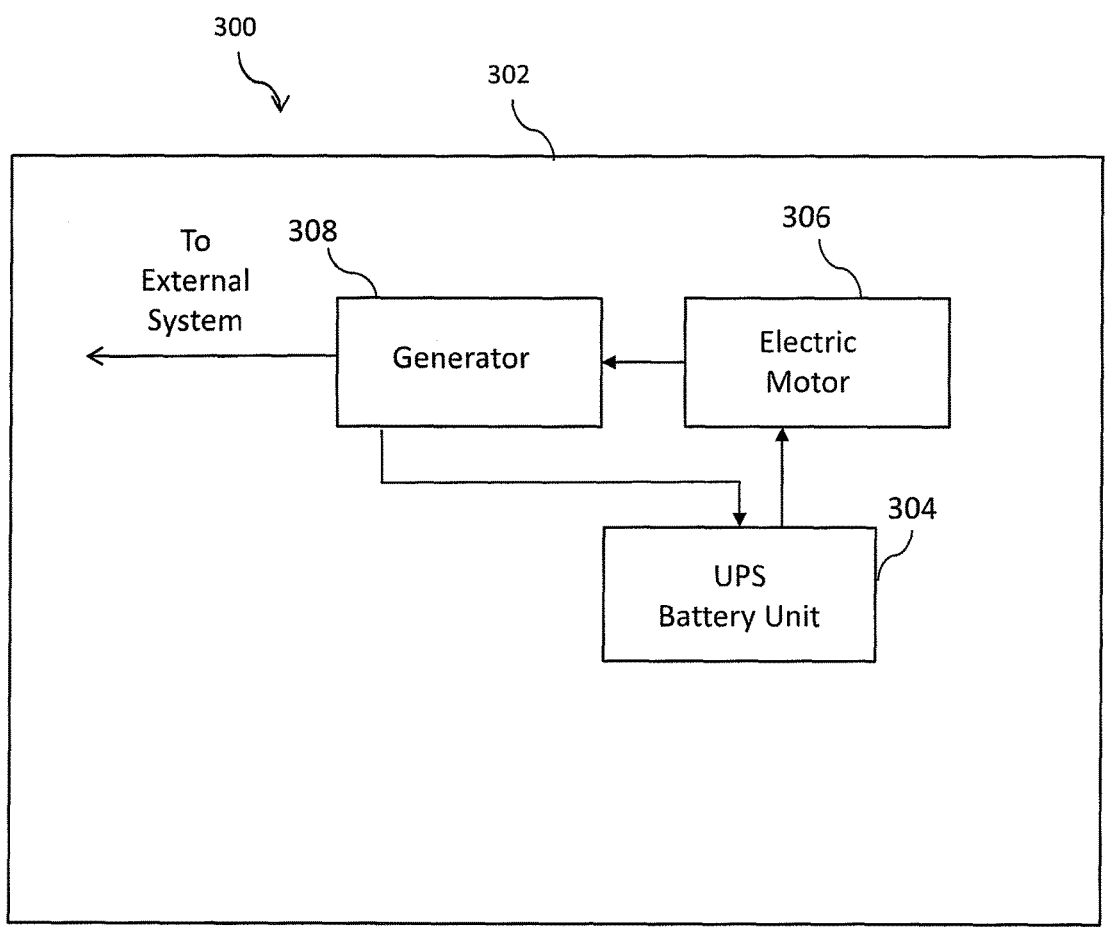
FIG. 3 is a block diagram of a self-recharging electric generator system that can be implemented within alternative embodiments of the present invention.
Figure 4:
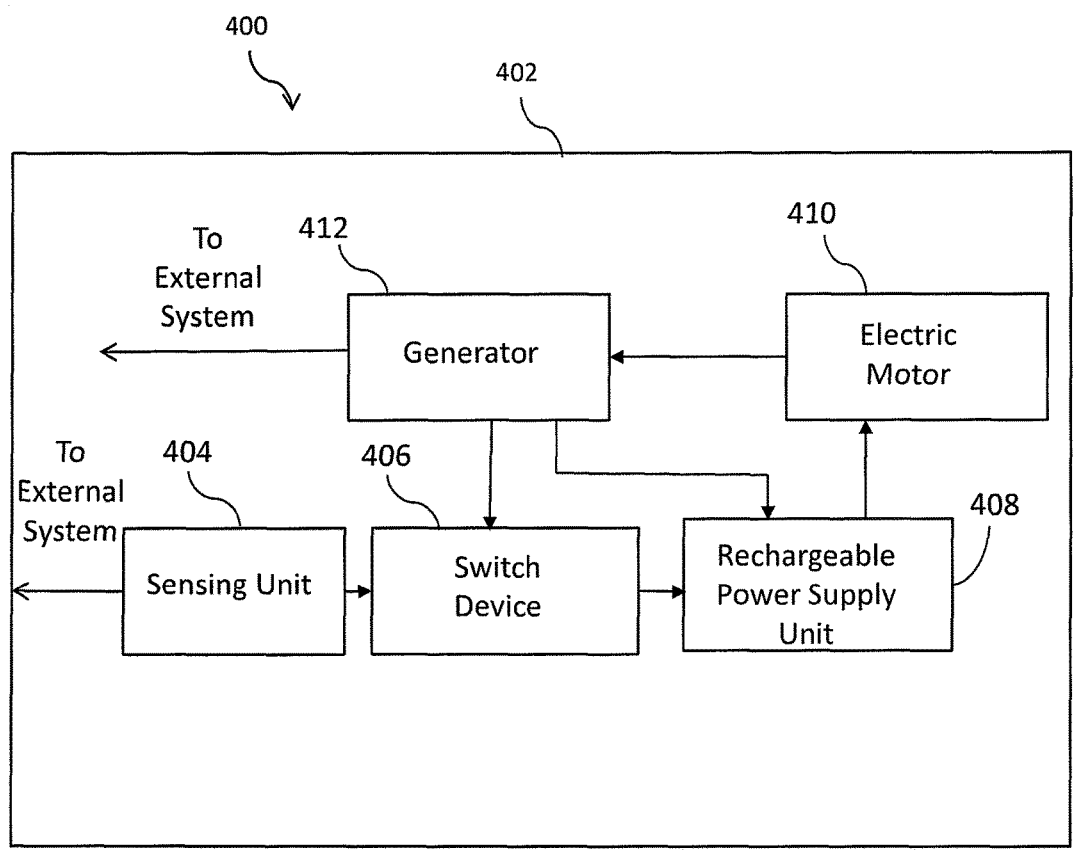
FIG. 4 is a block diagram of a self-recharging electric generator system that can be implemented within alternative embodiments of the present invention.
Figure 5:
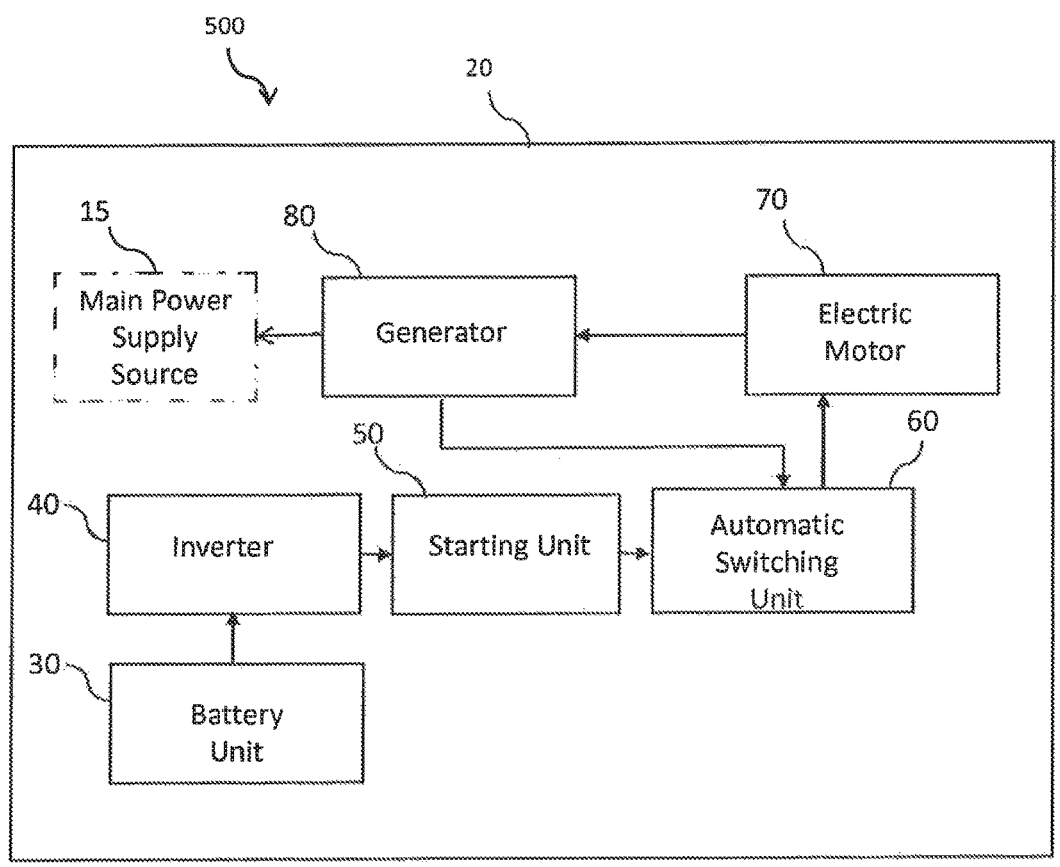
FIG. 5 is a block diagram of a self-recharging electric generator system that can be implemented within alternative embodiments of the present invention.

FIGS. 2 through 4 illustrate self-recharging electric generator systems that can be implemented within alternative embodiments of the present invention.

FIG. 2 is a block diagram of a self-recharging electric generator system 200 that can be implemented within one or more alternative embodiments of the present invention. Some of the components of the system 200 shown in FIG. 2 are similar to components of system 100 shown in FIG. 1 therefore a detailed description of these components is omitted. The system 200 shown in FIG. 2 includes a housing 202 comprising a rechargeable power supply unit 206, an electric motor 208, at least one generator 210, and a charging control unit 212. The charging control unit 212 is coupled to an external power source 250 including a renewable energy source (e.g., a plurality of solar panels or wind turbines or a combination thereof or any other type of renewable energy source).

According to embodiments of the present invention, the rechargeable power supply unit 206 comprises an automatic switching unit, a plurality of batteries (e.g., 12 volt (V) batteries), and an inverter to convert power to AC to be stored, to thereby be available to power the external system (e.g., residential home or recreational vehicle (RV)) during low power consumption period, or to start the electric motor 208 to turn the generator 210 to power the external system during peak operations.

The external power source 250 is configured to provide renewable energy (e.g., solar energy) to recharge the rechargeable power unit 206 when necessary. Recharging of the rechargeable power supply unit 206 is controlled by the charging control unit 212 (e.g., a voltage regulator) connected between rechargeable power supply unit 206 and the external power source 250. The automatic switching unit of the rechargeable power unit 206 operates to switch to use of the external power source 250 when recharging of the rechargeable power supply unit 206 is necessary. A sensing unit may be incorporated within the system 200 to indicate when a recharging operation of the rechargeable power supply unit 206 is required.

The generator 210, when receiving power from the electric motor 208, supplies power to the external system (e.g., the residential home or RV) and to the rechargeable power supply unit 206 such that the rechargeable power supply unit 206 receives power from both the generator 210 and the external power source 250. Therefore, the external system may also be powered directly from the rechargeable power supply unit 206. Two-stage generators 210 (i.e., a small generator and a larger sized generator) may be employed in one or more embodiments of the present invention.

In an alternative embodiment of system 200, the batteries of the rechargeable power supply unit 206 are optional, and automatic switching unit of the rechargeable power supply unit may switch from a power source, which is external to the system 200, to generator 210 as the source supplying the electric motor 208. The power source may be any type of battery including a rechargeable battery, a cell-type battery, a lithium ion battery, or any other type of battery unit suitable for the purposes set forth herein.

FIG. 3 is a block diagram of a self-recharging electric generator system 300 that can be implemented within one or more alternative embodiments of the present invention. Some of the components of the system 300 shown in FIG. 3 are similar to components of system 100 shown in FIG. 1 therefore a detailed description of these components is omitted. As shown in FIG. 3, the system 300 includes a housing 302 comprising an uninterruptible power supply (UPS) battery unit 304, at least one electric motor 306 and at least one generator 308. The UPS battery unit 304 is an electrical component that provides emergency power to a load upon failure of the main power supply in connection with the UPS battery unit 304. The UPS battery unit 304 provides near-instantaneous power when the failure of the main power supply occurs. The UPS battery unit 304 may be used with a battery unit or rechargeable power supply unit (as depicted in FIGS. 1 and 2) to supply power to the generator 308 shown in FIG. 3. The power from the UPS battery unit 304 is supplied to electric motor 306 which in turn starts operation of the generator 308.

The generator 308 then supplies power to the external system (e.g., a residential home, RV or electric vehicle). In the case of an electric vehicle, the system 300 may be connected with one or more batteries of an onboard battery system of the electric vehicle, to facilitate recharging of the onboard battery system. During recharging, one battery of the onboard battery system may be recharged using the system 300 while another battery of the onboard battery system is in use.

In an alternative embodiment of system 300, the battery unit 304 of the system 300 is optional, and a power source, which is external to the system 300, and the generator 308 serve as the sources supplying the electric motor 306. The power source may be any type of battery including a rechargeable battery, a cell-type battery, a lithium ion battery, or any other type of battery unit suitable for the purposes set forth herein.

FIG. 4 is a block diagram of a self-recharging electric generator system 400 that can be implemented within one or more alternative embodiments of the present invention. Some of the components of the system 400 shown in FIG. 4 are similar to components of system 100 shown in FIG. 1 therefore a detailed description of these components is omitted. The system 400 shown in FIG. 4 includes a housing 402 comprising at least one sensing unit 404, at least one switch device 406, a rechargeable power supply unit 408, at least one electric motor 410, and at least one generator 412.

The rechargeable power supply unit 408 includes an inverter to convert to 120 V power to start the electric motor 410. The electric motor 410 in turn starts the generator 412 to produce 120 to 220 V electric power. The generator 412 is connected with an external system (e.g., an electric vehicle) to supply power thereto. The generator 412 may be electrically coupled with the onboard electric battery system of the electric vehicle.

The sensing unit 404 is electrically coupled with the onboard electric battery system of the electric vehicle and is configured to determine when the onboard electric battery system needs to be charged. The sensing unit 404 sends a signal to the switch device 406 coupled thereto, to switch the rechargeable power supply unit 408 to an on-state to start the generator 412 to recharge the onboard electric battery system. According to an embodiment of the present invention, the sensing unit 404 may also be configured to determine the rate of charge necessary and the rate of consumption in order to thereby determine how many miles before an onboard battery of the onboard battery system is completely drained and is required to be recharged. Alternatively, in another embodiment of the present invention, a separate sensing unit external to the sensing unit 404 may be implemented to perform the above-identified operations.

According to one or more embodiments, the rechargeable power supply unit 408 may only remain in an on-state to start the electric motor 410. Alternatively, power produced by the generator 412 may be supplied back to the rechargeable power supply unit 408 for continuous charging of the rechargeable power supply unit 408.

If the onboard electric battery system of the electric vehicle includes a two battery system, the system 400 may be connected with one or both of the batteries to supply power thereto when necessary. For example, the system 400 may supply power to one battery while the other battery is in use by the electric vehicle, such that at least one battery is fully charged by the system 400 at all times while the electric vehicle is in use. A sensing unit 404 may be connected to each battery of the onboard battery system to determine the charge status of each battery for determining when recharging of either of the batteries is necessary. Further, a manual override system may be employed in the vehicle, to enable a user to control operation of the system 400, when desired.

In each of the systems shown in FIGS. 1-5, a battery unit, whether rechargeable or non-rechargeable, is optional within the respective self-recharging electric generator systems. Accordingly, the cost and weight of each respective system are reduced when the system does not include a battery unit.

Figure 6:
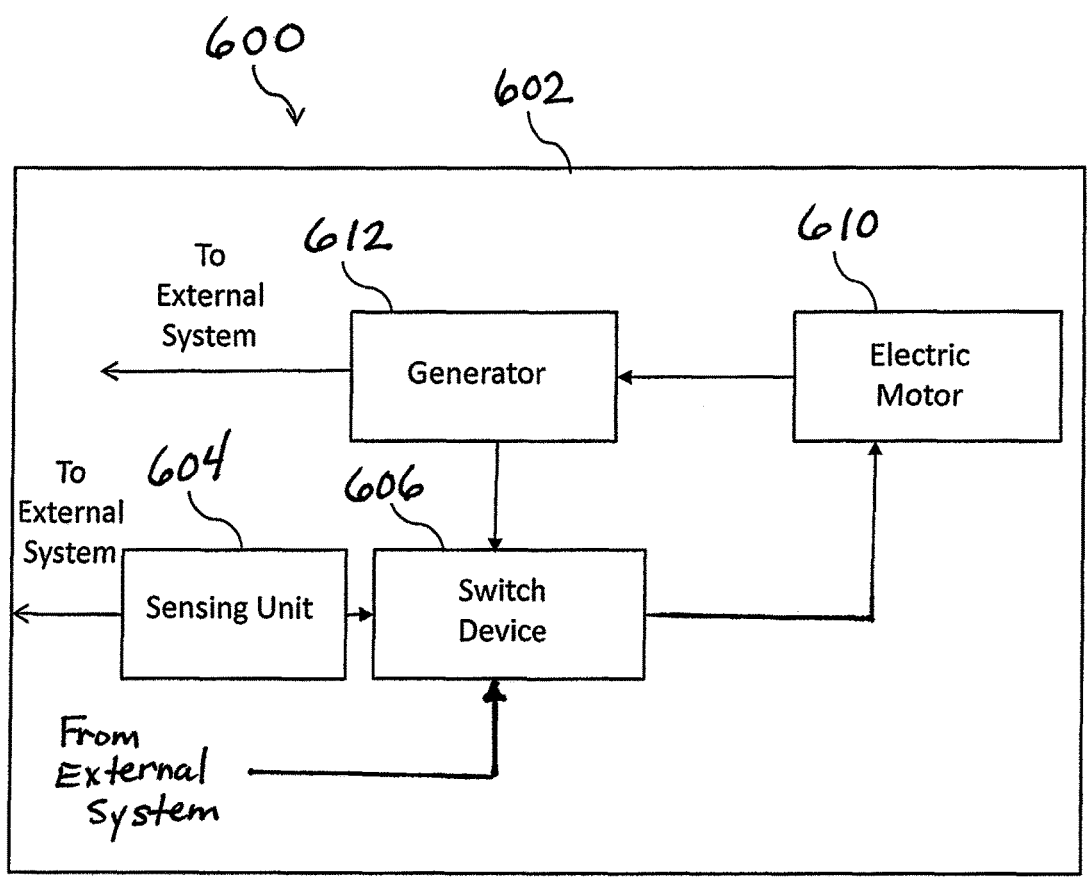
FIG. 6 is a block diagram of a self-recharging electric generator system that can be implemented within alternative embodiments of the present invention.

An exemplary embodiment of system 400 in FIG. 4, which does not include the optional internal battery unit, is shown in FIG. 6, which is a block diagram of a self-recharging electric generator system 600. In such an embodiment, the electric motor may receive power from an external power source to start the electric motor.

The self-recharging electric generator system 600 in FIG. 6 can be implemented within one or more alternative embodiments of the present invention. Some of the components of the system 600 shown in FIG. 6 are similar to components of system 100 and 400 shown in FIGS. 1 and 4, respectively. Therefore, a detailed description of these components is omitted. The system 600 shown in FIG. 6 includes a housing 602 including at least one sensing unit 604, at least one switch device 606, at least one electric motor 610, and at least one generator 612.

The power source of an external system (e.g., an electric vehicle) is electrically coupled with the electric motor 610 to supply power to the electric motor 610, where the power source may be a battery of the external system. In the case of an electric vehicle, for example, the external system may further include an onboard electric battery system. Both the external power supply and the onboard electric battery system may include, but are not limited to, at least one of any type of battery including a rechargeable battery, a cell-type battery, a lithium ion battery, or any other component or components having the ability to store energy for conversion to electricity.

Further, when the power source provides DC voltage, an inverter (not shown in FIG. 6) is in electrical communication with the power source to convert the DC voltage from the power source to AC voltage, to provide power to the self-recharging electric generator system 600 to start the electric motor 610. The electric motor 610 in turn starts the generator 612 to produce 120 to 220 V electric power. The inverter may be located internal to or external to the self-recharging electric generator system 600, and may be internal to or external to the external system. The generator 612 is connected with the external system to supply power thereto. The generator 612 may be electrically coupled with the onboard electric battery system of the external system.

The sensing unit 604 is electrically coupled with the onboard battery system of the external system and is configured to determine when the onboard battery system needs to be charged. The sensing unit 604 sends a signal to the switch device 606 coupled thereto, to switch from the power source of the external system (e.g., the vehicle battery) to the generator 612 as the source supplying electric motor 610, once the motor gets started and the generator 612 is producing electricity. According to an embodiment of the present invention, the sensing unit 604 may also be configured to determine the rate of charge necessary and the rate of consumption in order to thereby determine how many miles before an onboard battery of the onboard battery system is completely drained and is required to be recharged. Alternatively, in another embodiment of the present invention, a separate sensing unit external to the sensing unit 604 may be implemented to perform the above-identified operations.

If the onboard electric battery system of the electric vehicle includes a two battery system, the system 600 may be connected with one or both of the batteries to supply power thereto when necessary. For example, the system 600 may supply power to one battery while the other battery is in use by the electric vehicle, such that at least one battery is fully charged by the system 600 at all times while the electric vehicle is in use. A sensing unit 604 may be connected to each battery of the onboard battery system to determine the charge status of each battery for determining when recharging of either of the batteries is necessary. Further, a manual override system may be employed in the vehicle, to enable a user to control operation of the system 600, when desired.

According to another embodiment of the present invention, the generator system may be adapted to include a bank of batteries. The bank of batteries will be located in a separate housing according to one or more embodiments. The bank of batteries may be disposed in the housing between the generator system and a building to supply electric power to the building. While the generator system is supplying electric power to the building it is also charging the batteries. During low electricity demands or after a period of time, the generator system is configured to switch over to the batteries, thereby enabling the generator system to rest for a period of time until the battery power is reduced to its approximately ¼ power threshold. Once the threshold is met, the generator system restarts the generator and repeats the process.

Embodiments of the present invention provide a self-recharging electric generator system in communication with an external system and that includes a battery unit configured to supply power to the self-charging electric generator system, an automatic switching unit configured to switch between a main power supply source and the self-recharging electric generator system, at least one lo electric motor configured to receive power from the battery unit, and at least one generator configured to produce power to be supplied to the external system when a failure occurs at the main power supply source, where the power produced by the at least one generator is further supplied to the automatic switching unit for performing continuous recharging of the self-recharging electric generator system.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A self-recharging electric generator system in communication with an external system external to the self-recharging electric generator system, the external system comprising an external power source, the self-recharging electric generator system comprising:
- at least one electric motor configured to receive power from the external power source of the external system to start the at least one electric motor;
- at least one generator configured to be started by power received from the at least one electric motor, and to produce power to be supplied to the external system and to the at least one electric motor;
- at least one sensing device configured to be connected with an external battery system of the external system, to sense a charge status of the external battery system, wherein the external battery system is onboard the external system; and
- a switch device electrically coupled with the at least one sensing device and configured to switch from the external power source of the external system to the at least one generator as the source for supplying power to the at least one electric motor in response to a signal relating to the charge status of the external battery system received from the at least one sensing device.

2. The system of claim 1, wherein the external system is an electric vehicle.

3. The system of claim 2, wherein the external battery system includes two or more battery units, and the self-recharging electric generator system is connected with each battery unit and is configured to recharge each battery unit, alternately, to provide a continuous charge to the electric vehicle.

4. The system of claim 2, wherein the sensing device is configured to:
- determine a rate of charge for a battery unit of the external battery system of the electric vehicle; and
- determine a rate of consumption of the battery unit, to thereby determine a minimum distance traveled before the battery unit requires recharging.

5. The system of claim 1, wherein the external power source comprises an uninterruptible power supply (UPS) battery unit.

6. The system of claim 1, wherein the external power source comprises a rechargeable power supply unit configured to supply power to the at least one electric motor.

7. The system of claim 1, wherein the external power source comprises a lithium ion battery.

8. The system of claim 1, further comprising a housing configured to house the at least one electric motor, the at least one generator, the at least one sensing device, and the switch device.

9. A self-recharging electric generator system in communication with an external system external to the self-recharging electric generator system, the external system comprising an external power source, the self-recharging electric generator system comprising:
- at least one electric motor coupled with the external power source and configured to receive power from the external power source; and
- at least one generator configured to produce power to be supplied to the external system to continuously charge the external power source, and further configured to produce power to be supplied to the at least one electric motor.

10. The system of claim 9, wherein the external power source comprises an uninterruptible power supply (UPS) battery unit.

11. The system of claim 9, wherein the external power source comprises a rechargeable power supply unit configured to supply power to the at least one electric motor.

12. The system of claim 9, wherein the external power source comprises a lithium ion battery.

13. A self-recharging electric generator system in communication with an external system external to the self-recharging electric generator system, the self-recharging electric generator system comprising:
- a battery unit;
- at least one electric motor configured to receive power from the battery unit; and
- at least one generator configured to produce power to be supplied to the external system when a failure occurs at a main power supply source of the external system, and to supply power to the battery unit for charging of the battery unit.

14. A self-recharging electric generator system in communication with an external system external to the self-recharging electric generator system, the self-recharging electric generator system comprising:
- a battery unit;
- at least one electric motor configured to receive power from the battery unit;
- at least one generator configured to produce power to be supplied to the external system when a failure occurs at a main power supply source of the external system; and
- an automatic switching unit configured to switch between the main power supply source and the self-recharging electric generator system, wherein the power produced by the at least one generator is further supplied to the automatic switching unit to perform continuous charging of the battery unit.

15. The system of claim 14, wherein the at least one generator comprises a plurality of generators connected in parallel, and configured to operate in two stages.

16. The system of claim 14, further comprising:
- an inverter configured to convert the power supplied from the battery unit; and
- a starting device configured to start the self-recharging electric generator system.

17. The system of claim 14, wherein the battery unit comprises an uninterruptible power supply (UPS) battery unit.

18. The system of claim 14, wherein the battery unit comprises a rechargeable power supply unit configured to supply power to the at least one electric motor.

19. The system of claim 14, wherein the battery unit comprises a lithium ion battery.

20. The system of claim 14, further comprising a housing configured to house the battery unit, the at least one electric motor, the at least one generator, and the automatic switching unit.

\* \* \* \* \*